(12) United States Patent
Wick et al.

(10) Patent No.: US 11,701,201 B2
(45) Date of Patent: Jul. 18, 2023

(54) DEVICE FOR USE IN A WATER LINE

(71) Applicant: Adept Water Technologies A/S, Skovlunde (DK)

(72) Inventors: Michael Reidtz Wick, Solrød Strand (DK); Stine Skotte Bjerregaard, Jægerspris (DK); Poul Fogh, Albertslund (DK)

(73) Assignee: ADEPT WATER TECHNOLOGIES A/S, Skovlunde (DK)

( * ) Notice: Subject to any disclaimer, the term of this patent is extended or adjusted under 35 U.S.C. 154(b) by 808 days.

(21) Appl. No.: 16/607,638

(22) PCT Filed: Apr. 20, 2018

(86) PCT No.: PCT/EP2018/060134
§ 371 (c)(1),
(2) Date: Oct. 23, 2019

(87) PCT Pub. No.: WO2018/197347
PCT Pub. Date: Nov. 1, 2018

(65) Prior Publication Data
US 2020/0078135 A1    Mar. 12, 2020

(30) Foreign Application Priority Data

Apr. 26, 2017  (EP) .................................... 17168119
Oct. 11, 2017  (EP) .................................... 17195838

(51) Int. Cl.
*C02F 1/42*       (2023.01)
*A61C 1/00*      (2006.01)
(Continued)

(52) U.S. Cl.
CPC .............. *A61C 1/0076* (2013.01); *C02F 1/42* (2013.01); *C02F 1/461* (2013.01); *C02F 2103/003* (2013.01)

(58) Field of Classification Search
CPC .......... A61C 1/0076; C02F 1/42; C02F 1/461; C02F 2103/003
See application file for complete search history.

(56) References Cited

U.S. PATENT DOCUMENTS

| | | | |
|---|---|---|---|
| 5,947,727 A | 9/1999 | Kimura et al. | |
| 6,555,055 B1* | 4/2003 | Cisar | A61C 1/0076 205/687 |
| 2003/0044310 A1* | 3/2003 | Takahashi | A61C 1/0076 204/554 |

FOREIGN PATENT DOCUMENTS

| | | |
|---|---|---|
| EP | 1542610 A2 | 6/2005 |
| KR | 20080017874 A * | 8/2006 |

(Continued)

OTHER PUBLICATIONS

International Search Report and Written Opinion of the International Searching Authority dated Jun. 22, 2018, in corresponding International Application No. PCT/EP2018/060134; 12 pages.

*Primary Examiner* — Waqaas Ali
(74) *Attorney, Agent, or Firm* — Maier & Maier, PLLC

(57) ABSTRACT

A disinfection device suitable for disinfection of water in a water line, wherein the device is adapted to receive water from the water line and for the disinfected water to exit the device. The disclosure also relates to a DUWL including the disinfection device, as well as a dental chair comprising the DUWL. Moreover, embodiments of the disclosure concern a method for disinfection of water in a water line.

17 Claims, 1 Drawing Sheet

(51) Int. Cl.
*C02F 1/461* (2023.01)
*C02F 103/00* (2006.01)

(56) References Cited

FOREIGN PATENT DOCUMENTS

| WO | 2004028392 A2 | 4/2004 | |
|---|---|---|---|
| WO | 2006014080 A1 | 2/2006 | |
| WO | WO-2006014080 A1 * | 2/2006 | ........... A61C 1/0076 |
| WO | 2010037391 A1 | 4/2010 | |
| WO | WO-2015059651 A1 * | 4/2015 | ........... A61C 1/0007 |

* cited by examiner

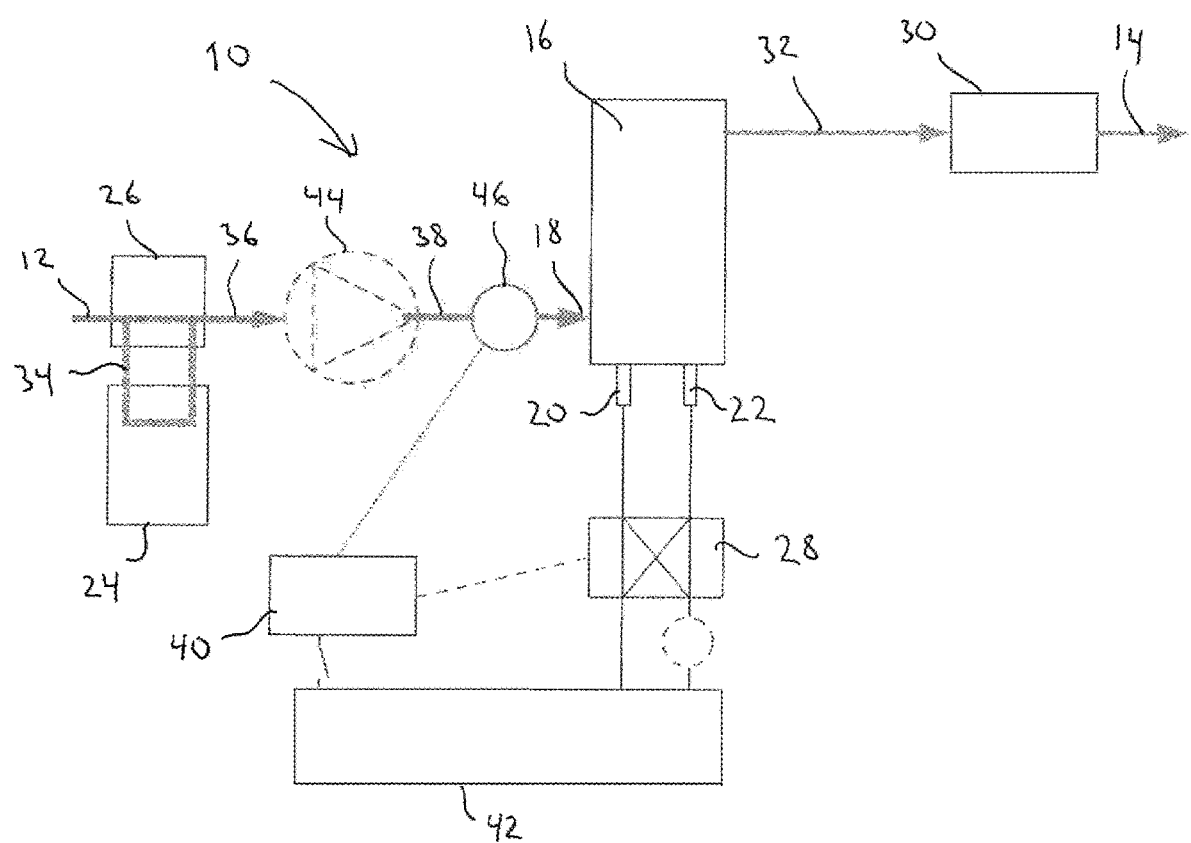

DEVICE FOR USE IN A WATER LINE

FIELD OF THE INVENTION

The present invention relates to a disinfection device suitable for disinfection of water in a water line, such as a DUWL. The invention also concerns a DUWL comprising the disinfection device of the present invention. Moreover, the present invention concerns a dental chair comprising the DUWL of the present invention. Furthermore, the present invention relates to a method for disinfection of water in a water line. Depending on the level of disinfection applied, the water itself may become a disinfecting liquid, which can be used to disinfect another water system, such as the DUWL itself or another medical system, or be used as surface disinfectant or medicinal water, such as use for surgery.

BACKGROUND OF THE INVENTION

It is well-known technology to use electrochemical devices in a dentist practice, such as dental chairs, for disinfection of water used by the dentist. In EP1542610 such maintenance apparatus is disclosed. Dentists use a variety of tools whilst performing procedures, including surgery, on patients' teeth and related facial structures. Such tools are, by their nature, expensive, so they are re-used numerous times with the dentist carrying out a cleansing operation between each procedure. Furthermore, during such dental procedures it is often necessary to provide cleaning liquid, in the form of tap water, distilled water or a water-based solution, to remove blood and other matter during those procedures, to wash patients' teeth and also in order to keep the relevant tools clean. Such fluid is usually supplied via a Dental Unit Water Line (DUWL). However, the quality of the fluid supplied is very much dependent upon the quality of the maintenance of the tools and the associated equipment, as well as the water line itself, and this varies considerably from dentist to dentist. Furthermore, the quality of the fluid entering the unit, usually from the public water system, affects the cleanliness of the fluid supplied. Many of the tools that are used are small, with narrow passageways passing there through. Also, public water supplies by definition can contain a notable number of bacteria and other organic contaminants such as algae, and the bacteria and other organic contaminants in the water have the opportunity to multiply to unacceptable levels when the water stands still in the DUWL either between patients, overnight, during weekends or vacation. Further, the bacteria can use normal constituents of water such as calcium deposits to build biofilm, which is difficult to combat once formed. Given all of this, the applicants have found that, even with optimum maintenance and rigorous checking and cleansing of the tools and their associated cleansing system and water lines, it is possible for contamination to build up and the fluid supplied to a patient via such tools to be contaminated. According to legislation in many countries the levels of bacteria in the water going into a patient's mouth may not exceed the level specified as drinking water quality. Another problem in the DUWL that needs to be addressed is that of mineral ions in the water lines. These converts to compounds such as calcium carbonate and magnesium carbonate and are deposited on the walls of the DUWL. Deposits in tubes, valves, passageways and expensive instruments making up the DUWL are a problem.

Similar problems with contaminations in other small water systems will be known to the skilled person, and it is obvious that while only mentioning DUWLs in the above, any small water system will benefit from the present invention. As a system for DUWLs must be constructed to medical device standards due to current regulations, water for dialysis machines, cooling water for medical devices, and other such systems are very much applications for the present invention. Similarly, disinfected water for washing patients in an operating theater could also very well be provided using the present invention.

SUMMARY OF THE INVENTION

The present inventors have designed a device which overcome many of the daily problems experienced when dealing with water in a water line, wherein the water or the water line needs disinfection, such as a DUWL associated with a dental chair.

The present invention is of course also useful in the drinking water applications, and the skilled person will realize that a wide range of sizes and applications are possible.

In a broad aspect the present invention relates to a disinfection device suitable for disinfection of water in a water line, wherein the device is adapted to receive water from the water line and for the disinfected water to exit the device, comprising a) an electrochemical chamber for electrolysis of water entering the chamber from the water line,
b) an electrode connector configured for applying current to the electrodes, when current is applied to the electrode connectors,
c) an optional water softener adapted to receive the water from the water line before entering the electrochemical chamber,
d) an optional bypass, optionally integrated in the water softener, adapted to receive the water from the water line before entering the water softener,
e) a polarity reversing unit configured for reversing the polarity of the electrode connectors when current is applied to the electrode connectors,
f) a sterile filter unit adapted to receive the water from the electrochemical chamber, and for the filtered water to exit the sterile filter unit as disinfected water,
g) a connecting means for transporting the water in the water line to the bypass and water softener, for transporting the water in the water line from the bypass and water softener to the electrochemical chamber, for transporting the water in the water line from the electrochemical chamber to the sterile filter unit, and
h) a control unit adapted to communicate with one or more selected from the group consisting of the electrochemical chamber, and the polarity reversing unit.

In one embodiment of the present invention the filtered and disinfected water enters the water line from the exit.

In another embodiment of the present invention the disinfection device comprises a user interface wherein the control unit is adapted to communicate with the user interface.

In a further embodiment of the present invention the disinfection device comprises a pumping means adapted to move the water from the bypass and water softener to the electrode chamber and further to the sterile filter unit and exit the filter unit.

In a still further embodiment of the present invention the pumping means is a pump which is located in the water line between the bypass and the electrode chamber.

In a further embodiment of the present invention the disinfection device comprises a flow signal unit for measuring a volume velocity of the water entering the electrochemical device, and capable of providing volume velocity data to the control unit.

In a still further embodiment of the present invention the disinfection device comprises a current measurement device for monitoring charge or current anywhere in the disinfection device, wherein the current measurement device is in communication with the control unit.

In a further embodiment of the present invention the bypass is a mechanical bypass.

In a still further embodiment of the present invention the bypass is integrated in the water softener.

In a further embodiment of the present invention the water softener is an ion exchange unit.

In a still further embodiment of the present invention the ion exchange unit is disposable, such as a cartridge type that can be exchanged after use.

In a further embodiment of the present invention the water line is a DUWL.

In a still further embodiment of the present invention a calcium monitoring unit is connected to the device.

In a further aspect, the present invention relates to a DUWL comprising the disinfection device of the present invention.

In a still further aspect, the present invention relates to a dental chair comprising the DUWL of the present invention.

In a further aspect, the present invention relates to a method for disinfection of water in a water line comprising
a) connecting a disinfection device of the present invention to the water line and applying current to the device,
b) using the polarity reversing unit to control the reversal of the polarity of the electrode connectors,
c) leading water from the water line to the device of the present invention, and out of the device thereby providing the disinfected water.

In an embodiment of method of the present invention the water in the water line before entering the water softener has a hardness of at least 2 dH. Such as at least 5 dH, typically at least 8 dH, such as at least 10 dH, or even at least 20 dH.

In a further embodiment of method of the present invention the disinfection device comprises the flow signal unit, and electrical current is dosed according to a user setting, such as time controlled, and based on data from the flow signal unit.

In a still further embodiment of method of the present invention the disinfection device comprises the current measurement device, and electrical current is dosed based on monitoring of charge, current and/or changes in conductivity of the water.

Further objects and advantages of the present invention will appear from the following description, and claims.

BRIEF DESCRIPTION OF DRAWINGS

FIG. 1 illustrates an embodiment of the device of the present invention, which may be a portable stand-alone device and incorporate all of the units and section illustrated.

DESCRIPTION OF THE INVENTION

There are many advantages of the present invention in a broad context as well as further even more advantages aspects of the embodiments.

In connection with dental use of water from an in-line water supply, the use of an apparatus for disinfection of the water in a water line such as a DUWL, is necessary.

The disinfection device suitable for disinfection of water in a water line of the present invention has several advantages in that e.g. calcium carbonate on the cathodes in the electrochemical chamber due to water hardness can be removed. The precipitation from the cathodes in the electrochemical chamber, leads to calcium plugs in for instance valves and/or filters downstream of the water line, and such can also be avoided or at least reduced considerable over the prior art solutions. Water hardness is different all over the world and problems tend to arise when the hardness is above 2 dH and in particular becomes very problematic when water hardness is above 7-10 dH. Water hardness can be reduced by a softener, and in particular a water softener with disposable cartridges, is suitable for dental chairs. Removing or reducing water hardness using larger stationary facilities is also possible but such facilities needs salt to be supplied regularly. Any such water softener can be delivered with a bypass which makes it possible to increase softening of the water hardness with 50% or more. Such cartridges have reduced capacity and larger facilities demand room, technical maintenance and supply of salt. In connection with a DUWL dental chair the use of disposable cartridges for water softening is more user friendly and compliant, but such cartridge has to be exchanged from time to time, and some water softener cartridges have a capacity of less than 400 liters at 20 dH, at a modest but realistic consumption of 10 liter/day, which means that the cartridge has to be changed every 40 days. Due to space capacity, there is no room for a larger cartridge or a stationary water softener facility in a dental practice.

In a broad aspect, the present invention relates to a disinfection device suitable for disinfection of water in a water line, wherein the device is adapted to receive water from the water line and for the disinfected water to exit the device, comprising
a) an electrochemical chamber for electrolysis of water entering the chamber from the water line,
b) an electrode connector configured for applying current to the electrodes, when current is applied to the electrode connectors,
c) a polarity reversing unit configured for reversing the polarity of the electrode connectors when current is applied to the electrode connectors,
d) a sterile filter unit adapted to receive the water from the electrochemical chamber, and for the filtered water to exit the sterile filter unit as disinfected water,
e) a connecting means for transporting the water in the water line to the bypass and water softener, for transporting the water in the water line from the bypass and water softener to the electrochemical chamber, for transporting the water in the water line from the electrochemical chamber to the sterile filter unit, and
f) a control unit adapted to communicate with one or more selected from the group consisting of the electrochemical chamber, and the polarity reversing unit.

The disinfected water exiting the device contains chlorine and chloride and depending on the electrolysis the skilled person knows how to adjust charge, current and/or conductivity of the water, so that the disinfected water can be used for cleaning of instruments and/or water lines, and that depending on the concentration of chlorine such disinfected water may find use in medical systems, such as dialysis machines, cooling water for medical devices or other systems, where microbiology should be controlled, or for use in disinfecting water for surgery, or water for water posts and single faucets.

In an embodiment of the above aspect the disinfection device further comprises a water softener adapted to receive the water from the water line before entering the electrochemical chamber. In a further embodiment, the disinfection device further comprises a bypass, optionally integrated in the water softener, adapted to receive the water from the water line before entering the water softener.

In an aspect, the present invention relates to a disinfection device suitable for disinfection of water in a water line, wherein the device is adapted to receive water from the water line and for the disinfected water to exit the device, comprising
a) an electrochemical chamber for electrolysis of water entering the chamber from the water line,
b) an electrode connector configured for applying current to the electrodes, when current is applied to the electrode connectors,
c) a water softener adapted to receive the water from the water line before entering the electrochemical chamber,
d) a bypass, optionally integrated in the water softener, adapted to receive the water from the water line before entering the water softener,
e) a polarity reversing unit configured for reversing the polarity of the electrode connectors when current is applied to the electrode connectors,
f) a sterile filter unit adapted to receive the water from the electrochemical chamber, and for the filtered water to exit the sterile filter unit as disinfected water,
g) a connecting means for transporting the water in the water line to the bypass and water softener, for transporting the water in the water line from the bypass and water softener to the electrochemical chamber, for transporting the water in the water line from the electrochemical chamber to the sterile filter unit, and
h) a control unit adapted to communicate with one or more selected from the group consisting of the electrochemical chamber, and the polarity reversing unit.

In one embodiment of the present invention the filtered and disinfected water enters the water line from the exit.

In another embodiment of the present invention the disinfection device comprises a user interface wherein the control unit is adapted to communicate with the user interface. A typical, user interface is an integrated part of the device of the present invention, but may also be remote and selected from a computer, an ipad, a smart phone, a notebook, and a mac.

In a further embodiment of the present invention the disinfection device comprises a pumping means adapted to move the water from the bypass and water softener to the electrode chamber and further to the sterile filter unit and exit the sterile filter unit.

In a still further embodiment of the present invention the pumping means is a pump which is located in the water line between the bypass and the electrode chamber.

In a further embodiment of the present invention the disinfection device comprises a flow signal unit for measuring a volume velocity of the water entering the electrochemical device, and capable of providing volume velocity data to the control unit. In a further embodiment of the present invention the flow signal unit is selected from an impeller type, a mass flow meter, a magnetic type, a gear type sensor, a Coriolis type sensor.

In a still further embodiment of the present invention the disinfection device comprises a current measurement device for monitoring charge or current anywhere in the disinfection device, wherein the current measurement device is in communication with the control unit.

In a further embodiment of the present invention the bypass is a mechanical bypass.

In a still further embodiment of the present invention the bypass is integrated in the water softener.

In a further embodiment of the present invention the water softener is an ion exchange unit.

In a still further embodiment of the present invention the ion exchange unit is disposable, such as a cartridge type that can be exchanged after use.

In a further embodiment of the present invention the water line is a DUWL.

In a still further embodiment of the present invention a calcium monitoring unit is connected to the device.

In a further embodiment, the device of the present invention is a stand-alone device. In a still further embodiment, the device of the present invention is a portable and stand-alone device.

In a further aspect, the present invention relates to a DUWL comprising the disinfection device of the present invention.

In a still further aspect, the present invention relates to a dental chair comprising the DUWL of the present invention.

In a further aspect, the present invention relates to a method for disinfection of water in a water line comprising
a) connecting a disinfection device of the present invention to the water line and applying current to the device,
b) using the polarity reversing unit to control the reversal of the polarity of the electrode connectors,
c) leading water from the water line to the device of the present invention, and out of the device thereby providing the disinfected water.

In an embodiment of method of the present invention the water in the water line before entering the water softener has a hardness of at least 2 dH. In a further embodiment of method of the present invention the water in the water line before entering the water softener has a hardness of at least 3 dH. In a still further embodiment of method of the present invention the water in the water line before entering the water softener has a hardness of at least 5 dH. In a further embodiment of method of the present invention the water in the water line before entering the water softener has a hardness of at least as at least 7 dH. In a still further embodiment of method of the present invention the water in the water line before entering the water softener has a hardness of at least 10 dH. In a further embodiment of method of the present invention the water in the water line before entering the water softener has a hardness of at least 20 dH.

In another embodiment of method of the present invention the water entering the electrochemical chamber has a hardness below 8 dH, such as below 4 dH.

In a further embodiment of method of the present invention the disinfection device comprises the flow signal unit, and electrical current is dosed according to a user setting, such as time controlled, and based on data from the flow signal unit.

In a still further embodiment of method of the present invention the disinfection device comprises the current measurement device, and electrical current is dosed based on monitoring of charge, current and/or changes in conductivity of the water.

Typically, the water to be disinfected comprises some amount of chloride, in the form of chloride ions, and preferably the water to be disinfected contain at least 2 ppm, such as at least 5 ppm, such as at least 7 ppm, e.g. at least 10 ppm of chloride ions. Typically, the water to be disinfected contain from 10 ppm to 250 ppm of chloride ions.

The term "a water line" as used herein means any line, such as plastic or metal tubes, that are suitable for transporting water, such as a DUWL for use in connection with the daily operation of a dental chair at a dental practice.

The term "a control unit" as used herein means a device or apparatus, or set of devices, that controls, manage, command, direct and/or regulates the behavior of one or more selected from the group consisting of the pumping means, the electrochemical chamber, the flow signal unit, and the current supply.

The term "pumping means" as used herein means a pump or a means of transporting water from the bypass and water softener to the electrochemical chamber, and further to the sterile filter unit, such means may be by gravity, such as, for instance, if the water line is located above the bypass and water softener and the electrochemical chamber, when the device is in operation and receives water from the water line.

The term "an electrochemical chamber for electrolysis of water" as used herein means that the chamber has one or more pairs of electrodes, such as one or more pairs of electrode plates. Preferably the electrode is a pair of parallel and symmetrically arranged electrode plates, such as perforated electrode plates, made of a conductive material, such as expanded metal, and having a suitable distance for providing electrolysis. An example of such an electrode is disclosed in PCT/DK2009/000215. The conductive material is without limitation selected from a metal such as copper, aluminium, titanium, doped diamond, tin, silver, nickel, platinum, iron, lead, and oxides thereof, and alloys thereof. Typically, the electrode plates are made of titanium covered with ruthenium/iridium oxide. To each electrode, such as electrode plate, an electrode connector is attached or integrated, which connector is used to apply current to the electrode plate.

The term "a polarity reversing unit" as used herein means a unit that can reverse the poles so that the cathode and anode switch places when desired, for instances on a timely basis, when current is applied to the electrodes, such as a Double-Pole-Double-Throw relay, a series of Single-Pole-Single-Throw-relays, a H-bridge made from schwitcing relays or solidstate relays or other means of reversing the direction of the potential.

The term "a current measurement device" as used herein means a device for monitoring charge or current anywhere in the disinfection device, such as a hall sensor or the measurement of a voltage drop over a known resistor.

The term "a flow signal unit" as used herein means an instrument, such as a flow meter, used to measure linear, nonlinear, mass or volumetric flow rate of a liquid or a gas. Examples of flow meters suitable for use in the device of the present invention are selected from an impeller type, a mass flow meter, a magnetic type, a different gear type sensor, a coriolis type sensor.

The term "a sterile filter unit" as used herein means a filter that effectively removes microorganisms, such as a membrane filter with a with pore size 0.2 µm. Examples are Ceramic membranes, Hollow fiber PES filters, Teflon type membrane filters.

The term "a connecting means" as used herein means a liquid and air tight connection between two units, such as the water softener and the electrochemical chamber, which is adapted for transportation of the water, such as tubes, pipes or the like made of plastic, metal or the like.

The term "a bypass" as used herein means a device configured to let water flow through the bypass or be diverted through a water softener, and the bypass may be integrated in the head of the water softener or the cartridge of the water softener. The bypass ratio is typically from 25-50% volume.

The term "a water softener" as used herein means a unit that removes calcium, magnesium and other metal cations from the water. Typically, the water softener is selected from an ion exchange unit. Other water softeners are selected from the group consisting of a cartridge type that is disposable, such as an ion exchanger unit available from companies 3M or BWT.

The term "a user interface" as used herein means a computer, an ipad, a smart phone, a notebook, and a mac, incl monitor, as well as any other apparatus that makes it possible for a user to follow the process parameters of the device when in operation. The user interface is preferably an integrated part of the device of the present invention, but may also be remote.

The present inventors have provided a device for killing bacteria described in PCT/DK2009/000215, containing a pair of parallel and symmetrically arranged perforated electrode plates, which electrodes are also suitable for use in the present invention. Thus, in a further embodiment the electrode comprises a pair of parallel and symmetrically arranged perforated electrode plates having a suitable distance, wherein each pair is optionally fitted with a fuse, wherein a suitable current density is applied, and wherein the plates are made of a conductive material and are arranged in a perpendicular plane. Typically, the pair of parallel and symmetrically arranged perforated electrode plates has/have a distance selected from 1-5 mm, such as 1, 1.6, 2, 3, 4 or 5 mm and combinations thereof. The electrodes are arranged in pairs that may have the same distance between the plates or may have different distance between the plates, if more than one pair of electrodes is present. Typically, from 1 to 11 pairs of parallel and symmetrically arranged perforated electrode plates are present, such as 1-10, 2-9, 3-8, 4-7, or 5-6 pairs of parallel and symmetrically arranged perforated electrode plates.

When a pair of parallel and symmetrically arranged electrode plates, such as perforated plates, is used, such pair of parallel and symmetrically arranged electrode plates is optionally arranged such that in a perpendicular plane view 30-100%, such as 60-100%, of the area of passage is inserted by the electrodes. The lower percentage below 60% is less advantageous, but if only two electrodes are present, more economical and practical.

Typically, the current density is above 5 mA/cm$^2$, such as from 5 to 30 mA/cm$^2$.

An experiment was carried out and during operation the present invention demonstrated, with a current density of 24 mA/cm$^2$ and a total current of 4 A, pulsed in pulses of 50-1000 ms every 30 mL of water, an ability to produce 0.3-10 ppm of chlorine measured in tap water with conductivities ranging from 1000 µS/cm to 1500 µS/cm, and a chloride content of 5-200 ppm, at a flow of 1 L/min

DRAWINGS

The invention will now be described more fully with reference to the appended drawing illustrating typical embodiments of the invention. This drawing is by no means limiting the scope of the present invention and is only intended to guide the skilled person for better understanding of the present invention.

FIG. 1 illustrates a typical embodiment of the device of the present invention. Water from a water line (12), such as a DUWL, is connected to the disinfection device (10) and after treatment in the device, exit (14) the device, and is optionally in fluid connection with the water line to provide disinfected water to the end user, such as a dentist. The disinfection device (10) comprises an electrochemical chamber (16) for electrolysis of water entering the chamber (16) from the water line (18). The electrochemical chamber (16) has two electrode connectors (20, 22) configured for applying current to the electrodes (not shown), when current is applied to the electrode connectors (20, 22). The water from the water line (12) runs to a water softener (24) with a bypass (26) adapted to receive the water from the water line before entering the electrochemical chamber (16). The bypass (26) is optionally integrated in the water softener (24), adapted to receive the water from the water line (12) before entering the water softener (24). Furthermore, a polarity reversing unit (28) is configured for reversing the polarity of the electrode connectors (20, 22) when current is applied to the electrode connectors (20, 22). The water flows from the bypass (26) and water softener (24) to the electrochemical device (16) and in the water line (38, 18) a flow signal unit (46) for measuring the volume velocity of the water (18) entering the electrochemical device (16), and capable of providing volume velocity data to the control unit (40) is provided. Furthermore, a pumping means (44), such as a pump, located in the water line (36, 38) between the bypass (26) and the electrode chamber (16), is provided and adapted to move the water from the bypass (26) and water softener (24) to the electrode chamber (16) and further to a sterile filter unit (30) and exit (14) the filter unit. When the water (32) leaves the electrochemical chamber (16) it flows to the sterile filter unit (30). The disinfected water and filtered water exit (14) the sterile filter unit (30). In order to transport the water through the device (10) several connecting means (12, 18, 32, 34, 36, 38) provides fluid communication so that water can flow from the bypass (26) and water softener (24) to the electrochemical chamber (16) and from the electrochemical chamber to the sterile filter unit (30), and can exit (14) optionally back into the DUWL (not shown). A control unit (40) is provided adapted to communicate with the electrochemical chamber (16), the flow signal unit (46) and the polarity reversing unit (28). Moreover, the control unit (40) is adapted to communicate with a user interface (42).

All references, including publications, patent applications and patents, cited herein are hereby incorporated by reference to the same extent as if each reference was individually and specifically indicated to be incorporated by reference and was set forth in its entirety herein.

All headings and sub-headings are used herein for convenience only and should not be construed as limiting the invention in any way.

Any combination of the above-described elements in all possible variations thereof is encompassed by the invention unless otherwise indicated herein or otherwise clearly contradicted by context.

Recitation of ranges of values herein are merely intended to serve as a short method of referring individually to each separate value falling within the range, unless other-wise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also provide a corresponding approximate measurement, modified by "about", where appropriate).

All methods described herein can be performed in any suitable order unless other-wise indicated herein or otherwise clearly contradicted by context.

The terms "a" and "an" and "the" and similar referents as used in the context of describing the invention are to be construed to insert both the singular and the plural, unless otherwise indicated herein or clearly contradicted by context. Thus, "a" and "an" and "the" may mean at least one, or one or more.

The term "and/or" as used herein is intended to means both alternatives as well as each of the alternatives individually. For instance, expression "the municipal water and/or saline water from the container" means "the municipal water and saline water from the container; the municipal water; or the saline water from the container", all three alternatives are subject to individual embodiments.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

This invention includes all modifications and equivalents of the subject matter re-cited in the aspects or claims presented herein to the maximum extent permitted by applicable law.

The features disclosed in the foregoing description may, both separately and in any combination thereof, be material for realizing the invention in diverse forms thereof.

We claim:

1. A disinfection device suitable for disinfection of water in a water line, wherein the device is adapted to receive water from the water line and for the disinfected water to exit the device, comprising:
   a) an electrochemical chamber configured for electrolysis of water entering the chamber from the water line, wherein the electrochemical chamber has one or more pairs of electrodes made of titanium covered with ruthenium oxide or iridium oxide or both, and the electrochemical chamber is configured to electrolyze water containing at least 2 ppm chloride,
   b) an electrode connector configured for applying current to the electrodes, when current is applied to the electrode connectors,
   c) an optional water softener adapted to receive the water from the water line before entering the electrochemical chamber, d) an optional bypass, optionally integrated in the water softener, adapted to receive the water from the water line before entering the water softener, e) a polarity reversing unit configured for reversing the polarity of the electrode connectors when current is applied to the electrode connectors, f) a sterile filter unit adapted to receive the water from the electrochemical chamber, and for the filtered water to exit the sterile filter unit as disinfected water, g) a connecting mechanism means for transporting the water in the water line to the bypass and water softener, for transporting the water in the water line from the bypass and water softener to the electrochemical chamber, for transporting the water in the water line from the electrochemical chamber to the sterile filter unit, and h) a control unit adapted to communicate with at least one of the electrochemical chamber, and the polarity reversing unit.

2. The disinfection device of claim 1, wherein the filtered and disinfected water enters the water line from the exit.

3. The disinfection device of claim 1, wherein the filtered disinfectant enters the water line from the exit.

4. The disinfection device of claim 1, comprising:
a user interface wherein the control unit is adapted to communicate with the user interface.

5. The disinfection device of claim 1, comprising:
a pumping means adapted to move the water from the bypass and water softener to the electrode chamber and further to the sterile filter unit and exit the filter unit.

6. The disinfection device of claim 5, wherein the pumping means is a pump which is located in the water line between the bypass and the electrode chamber.

7. The disinfection device of claim 1, comprising:
a flow signal unit for measuring a volume velocity of the water entering the electrochemical device, and capable of providing volume velocity data to the control unit.

8. The disinfection device of claim 1, comprising:
a current measurement device for monitoring charge or current anywhere in the disinfection device, wherein the current measurement device is in communication with the control unit.

9. The disinfection device of claim 1, wherein the bypass is a mechanical bypass.

10. The disinfection device of claim 1, wherein the bypass is integrated in the water softener.

11. The disinfection device of claim 1, wherein the water softener is an ion exchange unit.

12. The disinfection device of claim 11, wherein the ion exchange unit is disposable, such as a cartridge type that can be exchanged after use.

13. The disinfection device of claim 1, wherein the water line is a DUWL.

14. The disinfection device of claim 1, wherein a calcium monitoring unit is connected to the device.

15. The disinfection device of claim 1, wherein a chlorine monitoring unit is connected to the device.

16. A Dental Unit Water Line (DUWL) comprising the disinfection device of claim 1.

17. A dental chair comprising the Dental Unit Water Line (DUWL) of claim 16.

* * * * *